United States Patent Office 3,419,062
Patented Dec. 31, 1968

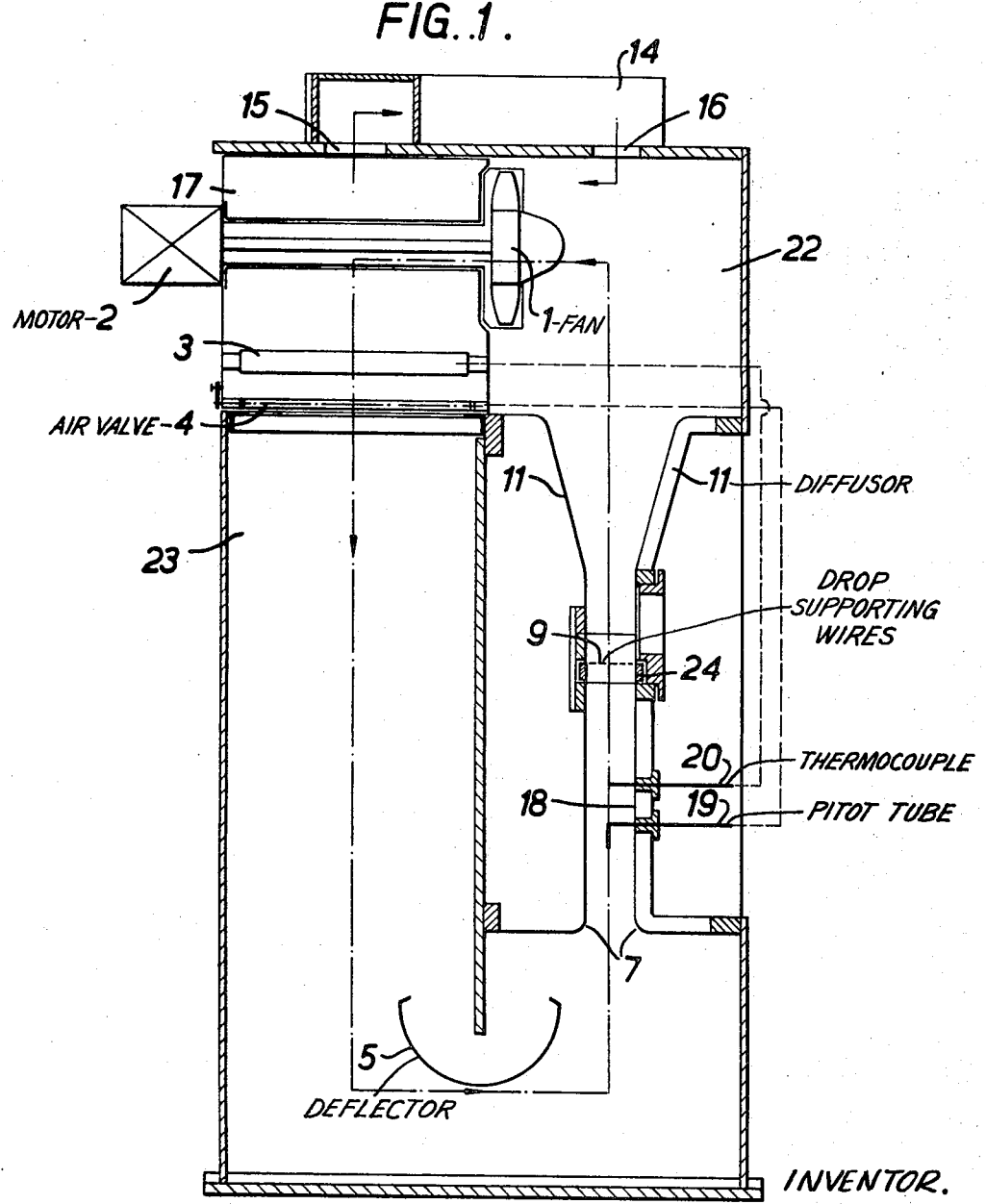

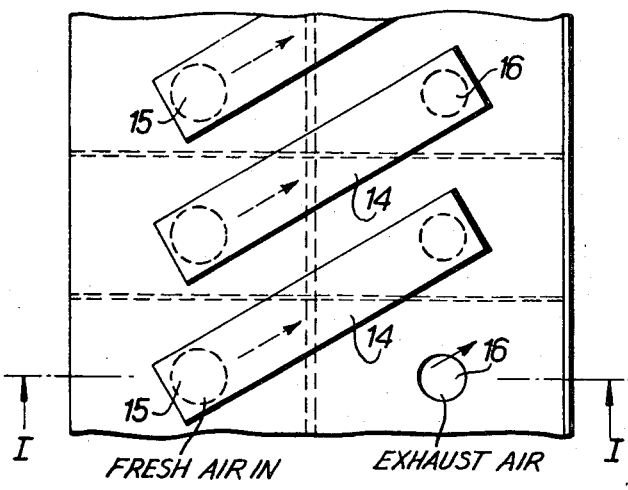
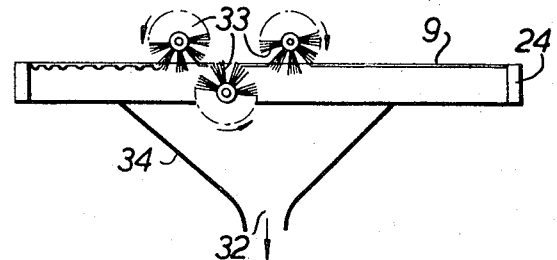
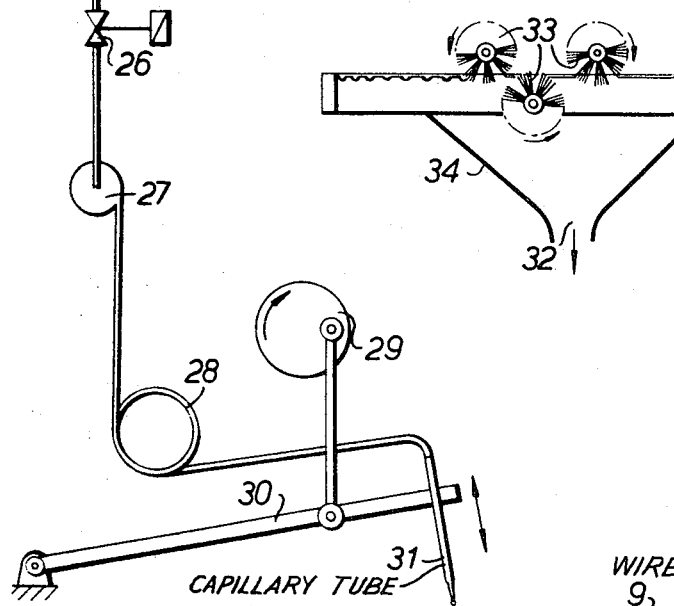

3,419,062
DRYING PROCESS
Cornelis Petrus Huysmans, Oss, Netherlands, assignor to Lever Brothers Company, New York, N.Y., a corporation of Maine
Filed Aug. 27, 1965, Ser. No. 483,216
Claims priority, application Great Britain, Sept. 10, 1964, 37,104/64
9 Claims. (Cl. 159—47)

ABSTRACT OF THE DISCLOSURE

Liquid solutions and slurries are concentrated by depositing droplets thereof on a carrier-structure, preferably consisting of taut filaments and thereafter subjecting the droplets to drying conditions.

---

This invention relates to the concentration of liquid solutions and slurries.

A common problem encountered in technology is the recovery of materials from solutions or suspensions in whch they occur. In the food industry, for example, such solutions or suspensions may be obtained by extracting, comminuting or pressing material of vegetable or animal origin, and it is usually desirable that the products so obtained be damaged as little as possible during the concentration process. For example dried products may be desired to reacquire, after rehydration, the organoleptic characteristics of the original fresh undried solution or suspension from which they were obtained. Obviously in such a case these may be the additional desideratum that the products should be easily soluble.

A very common method of recovering solid materials from solution is to evaporate the solvent by application of heat and/or vacuum; when such a treatment is applied to organic materials, however, irreversible deleterious changes in the solid material may occur, for example, oxidation, transesterification, polymerisation, denaturation of proteins, etc.; valuable aromatic substances may be lost; and there may be enzymatic hydroytic reactions and bacterial spoilage. Such changes tend to affect the product, for example by producing off-flavours and off-colours, or by inducing irreversible physical changes such as diminished solubility and deterioration of texture.

Similar problems, although sometimes less pronounced, may be encountered when the evaporation is allowed to proceed only so far that the end product is still liquid or pasty, or when a wholly liquid solution is to be concentrated.

In order to minimize some of the disadvantages inherent in well-known drying techniques it is sometimes preferable to accomplish the drying as quickly as possible by maintaining a high rate of evaporation, and this may be achieved by drying at a high temperature for a short time. Again, the drying process may be accelerated by exposing as large a surface of the product as possible to evaporation. A further method is to ensure that the vapour pressure of water at the surface of the liquid is kept as low as possible, for example, by the application of vacuum or by passing a current of dry gas over the evaporating surfaces.

When drying liquids, one way of obtaining a large surface area for evaporation is to sub-divide the liquid into droplets. For this reason spray-drying has acquired wide recognition and extensive application. In spray-drying a current of heated, relatively dry gas is often used to accelerate evaporation, but the velocity of the gas current must be restricted so as to enable the particles to settle. In this specification, unless otherwise indicated, "liquid" includes both solutions and suspensions, and "concentration" includes complete removal of solvent or suspending medium.

The present invention provides a concentration process in which a liquid containing material to be concentrated is attached to a carrier-structure and dried in the form of droplets.

The carrier-structure may be any solid device which is capable of supporting droplets of the liquid to be dried. By "solid" is meant not gaseous or liquid. Thus the carrier-structure may be of solid material in the form of a continuous or perforate structure, the surface properties of which are such that liquid droplets deposited or caused to form thereon remain substantially separate from each other.

The material of the carrier-structure may be a metal, for example, stainless steel, or it may be an organic substance, for example nylon or polytetrafluorethylene. Alternatively the material of the carrier-structure may be, for example, a metal coated with an organic substance. It is preferable that the material of the carrier-structure, or at least that part which contacts the liquid, should be resistant to corrosion and should not react with, nor contaminate the liquid to be dried.

It will generally be preferred that the carrier-structure retains its shape during the drying operation, so that running together and coalescence of the droplets, caused, for example, by sagging of the carrier-structure, is avoided. It is preferred, therefore, that the carrier-structure is suitably tensiored so as to avoid or minimise undesirable change of shape. Thus, the material of the carrier-structure itself may be elastic, or the structure may be kept taut by any suitable means, for example by passing it, or its supporting means, over rollers or similar guides which are mounted so as to provide the necessary tension.

In a preferred embodiment the carrier-structure consists of taut filaments. Several filaments may be arranged para'lel or substantially parallel to each other and may be spced apart at a desired distance, for example by grooves in guide rolls. Alternatively, the carrier-structure may consist of a mesh of filaments. Again, the carrier-structure may consist of a plurality of filaments in a supporting frame. Clearly the strength of the filaments must be sufficient to withstand applied tension necessary for maintaining the shape of the carrier-structure.

It is preferable that the filaments are not readily wettable by the liquid. For example, the filaments may be made of or coated with a hydrophobic substance, for example, nylon or polytetrafluorethylene, and the droplets may then be attached to the carrier-structure very near to each other without coalescing.

A wide variety of methods are available for applying the droplets to the carrier structure. One method is to pass the liquid through a capillary tube, to move the end of the tube relative to the carrier-structure until a droplet of the solution touches the carrier-structure, and then to move the tube away from the carrier-structure, this action being repeated to provide the required number of droplets. Droplets may be deposited by passing the carrier-structure in a substantially horizontal plane under and in contact with a thin stream of liquid to be treated. This thin stream may be obtained by passing the liquid through a capillary tube and for the droplets to form satisfactorily the surface of the carrier-structure should be substantially non-wettable. The amount of liquid deposited on the carrier-structure will be influenced by the inner diameter of the tube and capillary tubes having an inner diameter of 0.3 to 1.0 mm. have been found most suitable.

The production of droplets that are uniform in size and distribution may be assisted by applying a pulsating action to the liquid stream at a suitable point prior to its application to the carrier-structure. By selecting a suitable frequency pulsation, the size and the distance apart of the droplets may be controlled to some extent. The liquid may, for example, be passed along a vibrating membrane before passing to the capillary tube, which membrane may, for example, be caused to vibrate by the effect of an alternating current. An alternating current of 50 cycles per second has been found to be particularly suitable for this purpose.

In another method of forming droplets, the liquid may be atomised and attracted to the carrier-structure by creating an electrical potential between the carrier-structure and the liquid. This method is preferred when the carrier-structure is a filamentous mesh or gauze. Alternatively the carrier-structure may be passed through the liquid to be dried and, provided the carrier-structure is constructed of suitable material, the liquid retained by the carrier-structure should form separate droplets.

The maximum size of the droplets which can be attached to the carrier-structure depends inter alia on the nature of the surface of the carrier-structure and on the surface tension of the solution. In the preferred embodiment of the invention, when the carrier-structure consists of filaments, the diameter of the filament also influences the size of the droplets it can carry. Droplets having a volume of 0.25 to 20 microlitres are particularly suitable. For water droplets attached to a nylon filament (velocity of gas stream 0) the following observations were made:

| Diameter filament (mm.) | Maximum volume of droplets in microlitres | Maximum number of droplets per 10 cm. filament | Volume of water per 10 cm. filament in microlitres |
|---|---|---|---|
| 0.25 | 10 | 30 | 300 |
| 0.6 | 17 | 23 | 390 |
| 1.0 | 24 | 20 | 480 |

Conveniently droplets are applied to the carrier-structure which is then transferred to a drying zone where concentration of the liquid occurs, although the droplets may, of course, be applied to the carrier-structure while it is actually in the drying zone. In a preferred embodiment the droplets are applied to the carrier-structure which then passes through a drying zone and, after emerging from the drying zone the dried material is removed from the carrier structure. Usually the carrier-structure will proceed in a horizontal direction through the drying zone, although the actual disposition of the carrier structure may be varied, consistent with maintaining the liquid in droplet form.

The drying time is dependent on the character of the liquid to be dried, the size of the droplets, the velocity, humidity and temperature of the gas stream (when employed), and the velocity at which the carrier with the droplets attached passes through the drying zone. Preferably it will be ¼ to 8 minutes.

When a gas stream is employed the gas will usually be air, but in some cases it may be desirable to use an inert gas, as when, for example, juices of vegetable or animal origin containing substances prone to oxidation are to be concentrated or dried. The velocity of the gas will be such that the droplets are not dislodged from the supporting carrier-structure nor deformed so that they coalesce, and will not normally exceed 12 m./sec. Preferably the gas velocity is between 3 and 12 m./sec. Evaporation may further be accelerated by the application of vibrations, which may be imparted to the droplets through the carrier-structure or through the gas or both, but with insufficient force to dislodge the droplets.

The stream of gas may flow in any direction. In a preferred embodiment of the invention the gas flow is in a resultant direction contrary to the direction of movement of the carrier structure.

It may in some cases be preferable to use a stream of gas moving in the same direction as the carrier-structure. For example, the loss of volatile organic aromatic substances from a liquid may be reduced by inducing rapid evaporation, so as to form a "film" around the droplets, and in such a case the gas contacting the droplets immediately after entering the drying zone is preferably as dry as possible; in such a case concurrent gas flow is desirable.

The drying zone may be sub-divided into sections which are traversed successively by the droplets. In each of these sections the temperature, velocity and humidity of the gas stream, if used, may be selected so as to concentrate the liquid to the required degree. In the first section the fluid content of the droplets will usually be high and provided a sufficiently high gas velocity is selected, the temperature of the droplets may not rise appreciably. In later sections of the drying zone, where the fluid content of the droplets may have fallen considerably, the temperature may tend to rise unduly so that, in order to avoid deterioration of the product, the temperature of the gas stream should be lowered. Alternatively, the velocity of the gas stream may be increased, as there is less tendency for the droplets to be dislodged.

Evaporation of the droplets may also be accelerated by decreasing the gas pressure in the drying zone. Under such conditions if a gas stream is not used the necessary energy for the evaporation may be supplied, for example, by radiant heat, by passing an electrical current through the carrier-structure by ultrasonic vibration or by a combination of these methods.

The application of low pressure with or without a source of heat provides a way for freeze-drying of the droplets. This is especially of importance for substances which are heat labile. Freeze-drying may also be achieved by using a stream of unheated or even cooled gas in which the partial vapour pressure of the liquid to be evaporated is below the vapour pressure of the liquid at its freezing point.

In order to detach the dried or concentrated material from the carrier-structure, several kinds of scrapers and brushes may be used; bifurcated metal scrapers, which scrape each filament in the angle between the "legs" of the scrapers, are particularly suitable.

If necessary further drying of the droplets or the material they contain may be carried out by conventional methods after removal from the apparatus.

The process of the invention is particularly applicable to the drying of juices or pastes of vegetable origin, for example, orange juice or of animal origin, for example meat extract obtained, for example, by pressing, comminuting, extracting or fluidizing by enzymic action.

In some instances it may be preferable to preconcentrate the fluid material by any suitable method known in the art, before subjecting it to the process according to the invention.

In the foregoing description the liquid to be evaporated has been assumed to be aqueous. It will, however, be evident that the principles involved are not limited to systems containing water as the component to be removed, being applicable also to systems containing other liquids.

For the purpose of illustration apparatus suitable for use in accordance with the invention is shown in the accompanying drawings in which:

FIGURE 1 is a vertical cross-section of the drying apparatus for carrying out the invention, the section being taken along the line I—I in FIGURE 2.

FIGURE 2 is a top view of part of the drying apparatus;

FIGURE 3 is a device for applying droplets to a carrier-structure; and

FIGURE 4 is a schematic representation of a device for detaching dried material from the carrier-structure.

In FIGURE 1, 1 represents a fan, powered by a motor 2. The velocity of the air is regulated by a hand-set valve 4, whilst its temperature can be varied by an electric heater 3.

After conditioning to the desired temperature and velocity in compartment 17, the air flows downward through the space 23 and then upward through the duct 18 with the "rounded" entrance 7. The deflector plate 5 helps to achieve uniformity in the flow of air. The duct 18 is about 10 times as high as it is wide and imparts a "streamlined" flow of air through the set of wires 9. These wires are stretched in a frame 24, which is moved at right angles to the plane of the drawing.

The air leaves the duct 18 via a diffusor 11 with an opening angle of 15°. From the diffusor the air enters the chamber 22, from which it is sucked into compartment 17 by the fan 1.

The air velocity is measured by a pitot tube 19, and the air temperature is sensed by the thermo-couple 20, which regulates the power input of the air heater 3.

FIGURE 2 gives an idea of the various sections or compartments into which the apparatus is sub-divided, these sections being so delimited by the horizontal dotted lines. The ports 15 and 16 serve as entrance and exit for the air in each section. The air flows from one section to the next by duct 14, which duct is provided with a valve to regulate the intersectional flow of air.

The following parameters are measured and regulated:

Wet and dry bulb temperature measured with thermo-couples.
Dry bulb temperature regulated by varying electric current through heater.
Wet bulb temperature regulated by supplying fresh dry air through air entrance port.
Air velocity measured with pitot tube regulated with hand-set valve.

In FIGURE 3, a reservoir 25 contains the liquid to be dried or concentrated; 26 is an electro-magnetic valve, 27 a pump, 28 a flexible hose, 31 a capillary tube, 29 an excenter actuating the bar 30, to which the capillary tube 31 is attached. 9 is one of the wires stretched in frame 24.

In FIGURE 4, 9 is one of the wires stretched in the frame 24, 33 are rotating brushes. The detached solid particles fall into the funnel 34 and are evacuated through the opening 32.

The performance of the process of the invention is illustrated by the following examples.

*Example 1*

This example describes the treatment of pasteurised milk.

The apparatus, of the type described above, was 1.80 m. in length and contained five sections. The filaments were of stainless steel, had a diameter of 0.6 mm. and were spaced apart at a distance of 3 mm. from centre-line to centre-line. Droplets of milk were attached to the filaments at a rate of 3 per second by forcing the liquid through a capillary tube, and subjecting the stream of liquid formed to a pulsating action at a frequency of 3 per second. The diameter of each droplet was 2 mm. and they were deposited at the rate of 3 per second at a distance of 3 mm. from centre to centre.

The drying time in the apparatus was 1½ minutes and the conditions in the various sections of the apparatus were as follows:

TABLE I

| Section | Temperature, ° C. | | Air Velocity, m./sec. |
|---|---|---|---|
| | Dry Bulb | Wet Bulb | |
| I | 130 | 50 | 5.6 |
| II | 100 | 45 | 12.2 |
| III | 70 | 35 | 12 |
| IV | 60 | 30 | 12 |
| V | 50 | 25 | 12 |

After treatment for 1½ minutes the droplets were not completely dry and further drying was therefore carried out by transferring the frames carrying the filaments to a drying room through which dry air of 40° C. was circulated. After 30 minutes the droplets were completely dry and were scraped from the filaments.

The dry product obtained could be easily reconstituted.

*Example 2*

This example is similar to Example 1 but with the following differences:

The droplets had a diameter of 1.5 mm. and were deposited 2.5 mm. apart (from centre to centre) at a rate of 2.5 droplets per second using a vibration action of 2.5 cycles per second. The drying time within the apparatus was 4 minutes. After this time the droplets were dried completely and could be scraped off easily, so that subsequent drying was unnecessary. The conditions in the various sections of the apparatus were as follows:

TABLE II

| Section | Temperature, ° C. | | Air Velocity, m./sec. |
|---|---|---|---|
| | Dry Bulb | Wet Bulb | |
| I | 145 | 43 | 5 |
| II | 108 | 39 | 13 |
| III | 90 | 35 | 13 |
| IV | 70 | 32 | 13 |
| V | 60 | 30 | 13 |

*Example 3*

This example is similar to Example 1, except that dextrin maltose (50% dextrin and 50% maltose) was added to the pasteurised milk in a proportion of 10 g. per 100 cm.$^3$ The drying time within the apparatus was again 1½ minutes, and the conditions in the various sections of the apparatus were as follows:

TABLE III

| Section | Temperature, ° C. | | Air Velocity, m./sec. |
|---|---|---|---|
| | Dry Bulb | Wet Bulb | |
| I | 120 | 50 | 5.5 |
| II | 100 | 45 | 12.2 |
| III | 70 | 35 | 11.8 |
| IV | 60 | 30 | 11.5 |
| V | 50 | 25 | 11.2 |

Terminal drying was carried out as described in Example 1.

*Example 4*

This example describes the drying of a solution of dextrin maltose.

A solution of dextrin maltose (50% dextrin and 50% maltose) in water (10 g. per 100 cm.$^3$) was treated in the same way as described in Example 1.

The drying time within the apparatus was 2.5 minutes and the conditions in the various sections of the apparatus were as follows:

TABLE IV

| Section | Temperature, ° C. | | Air Velocity, m./sec. |
|---|---|---|---|
| | Dry Bulb | Wet Bulb | |
| I | 140 | 60 | 5 |
| II | 120 | 50 | 12 |
| III | 100 | 45 | 12 |
| IV | 90 | 40 | 12 |
| V | 80 | 35 | 12 |

When leaving the apparatus the droplets were sufficiently dry to be scraped off immediately.

*Example 5*

A solution of dextrin maltose (50% dextrin and 50% maltose) in water (10 g. per 100 cm.$^3$) was attached to nylon filaments (0.5 mm. thick) in droplets of 1 mm. diameter, using a vibration of 50 cycles/sec. The distance between the centres of the droplets was 2.5 mm. Drying was effected as described in Example 1.

The drying time was 1.5 minutes and the conditions in the various sections of the apparatus were as follows:

TABLE V

| Section | Temperature, ° C. | | Air Velocity, m./sec. |
| --- | --- | --- | --- |
| | Dry Bulb | Wet Bulb | |
| I | 140 | 43 | 5 |
| II | 210 | 40 | 12 |
| III | 100 | 35 | 12 |
| IV | 90 | 30 | 12 |
| V | 90 | 30 | 12 |

When leaving the apparatus the droplets were completely dry. Terminal drying was unnecessary before scraping off the product.

*Example 6*

The example describes the concentration of orange juice.

Orange juice was first depectinized and filtered to obtain a clear liquid. Subsequently 10 g. dextrin maltose (50% dextrin and 50% maltose) per 100 cm.$^3$ juice were added and the liquid was treated as described in Example 1.

The drying time within the apparatus was 2.5 minutes and the conditions in the various sections of the apparatus were as follows:

TABLE VI

| Section | Temperature, ° C. | | Air Velocity, m./sec. |
| --- | --- | --- | --- |
| | Dry Bulb | Wet Bulb | |
| I | 130 | 60 | 6 |
| II | 95 | 50 | 12 |
| III | 70 | 45 | 12 |
| IV | 60 | 30 | 12 |
| V | 50 | 25 | 12 |

Terminal drying was accomplished as indicated in Example 1.

What is claimed is:

1. A process of concentrating a material by evaporating in droplet form a liquid which contains the material, which process comprises:
   (i) attaching the liquid containing said material in the form of droplets to a plurality of separated carrier filaments, the filaments being spaced apart a distance exceeding the maximum dimension of the droplet,
   (ii) subjecting said droplets to a drying treatment to concentrate the material, and
   (iii) removing the material in concentrated form from the filaments.
2. A process according to claim 1, in which the liquid is atomised and is attached to the filaments by applying an electric potential difference between the atomised liquid droplets and the filaments.
3. A process according to claim 1, in which the droplets have a volume of between 0.25 and 20 cu. mm., the distance between their centres on the filaments being between 1 and 5 mm.
4. A process according to claim 1, in which the droplets are subjected to ultrasonic vibration during the drying treatment.
5. A process according to claim 1, in which the temperature of the droplets during the drying treatment is below 50° C.
6. A process according to claim 1, in which the liquid is attached to the filaments by conducting the liquid through a plurality of capillary tubes moved relative to and in close proximity to the filaments whereby droplets emerging from the capillary tubes contact the filaments and are deposited thereon.
7. A process according to claim 6, in which before leaving the capillary tubes the liquid is subjected to a vibrating action.
8. A process according to claim 1, in which the drying treatment is carried out by means of a stream of unheated gas, the partial vapour pressure of the liquid in the gas being below the vapour pressure of the liquid at its freezing point.
9. A process according to claim 8, in which the drying treatment is commenced at a gas velocity of less than 10 m./sec., the gas velocity being increased to more than 10 m./sec. towards the end of the drying treatment.

References Cited

UNITED STATES PATENTS

| 1,965,509 | 7/1934 | Pantenburg | 264—297 |
| 2,191,827 | 2/1940 | Benner et al. | 118—5 |
| 2,948,966 | 8/1960 | Honson | 34—1 |
| 2,533,125 | 12/1950 | Levinson et al. | 34—76 |
| 2,825,653 | 3/1958 | Dorsey et al. | 159—49 |
| 2,969,111 | 1/1961 | Bocognano | 159—1 |
| 2,981,629 | 4/1961 | Ginnette et al. | 99—206 |
| 3,085,018 | 4/1963 | Viall et al. | 99—201 |
| 3,192,990 | 7/1965 | Natelson | 159—5 |
| 3,265,779 | 8/1966 | Gobla et al. | 264—5 |
| 3,287,472 | 11/1966 | Wolf et al. | 18—24 X |

FOREIGN PATENTS 758,128  9/1956  Great Britain.

NORMAN YUDKOFF, *Primary Examiner.*

J. SOFER, *Assistant Examiner.*

U.S. Cl. X.R.

18—1, 2.4; 264—297; 159—7; 99—199